Dec. 30, 1924.

T. S. JONES 1,521,301

DYNAMO ELECTRIC MACHINE

Filed June 14, 1922  2 Sheets-Sheet 1

Inventor
Thomas Stanley Jones
By Percy H. Wood
atty

Dec. 30, 1924.

T. S. JONES 1,521,301

DYNAMO ELECTRIC MACHINE

Filed June 14, 1922   2 Sheets-Sheet 2

Patented Dec. 30, 1924.

1,521,301

UNITED STATES PATENT OFFICE.

THOMAS STANLEY JONES, OF NEWPORT, ENGLAND.

DYNAMO-ELECTRIC MACHINE.

Application filed June 14, 1922. Serial No. 568,210.

*To all whom it may concern:*

Be it known that I, THOMAS STANLEY JONES, a subject of the King of Great Britain, residing at Newport, in the county of Monmouth, England, have invented certain new and useful Improvements in and Connected with Dynamo-Electric Machines, of which the following is a specification.

This invention relates to dynamo electric machines and has for its object to greatly increase the efficiency of such machine. It is applicable to direct current and alternating current generators and motors, induction motors, rotary transformers and rotary converters of all kinds and other electrical appliances which include rotary armatures in their constructions.

In general the invention comprises a cylindrical armature working in conjunction with exterior and interior pole or winding systems, means being preferably provided for varying and adjusting the relative positions of the exterior and interior systems and the arrangement being preferably such that the effect due to the co-operation between the exterior system and the armature is equal to the effect due to the interior system and the armature.

And in order that the invention may be better understood it will now be described with reference to the drawings accompanying this specification in which:—

The same numerals of reference are employed to denote the same parts in all the views.

Figure 1:
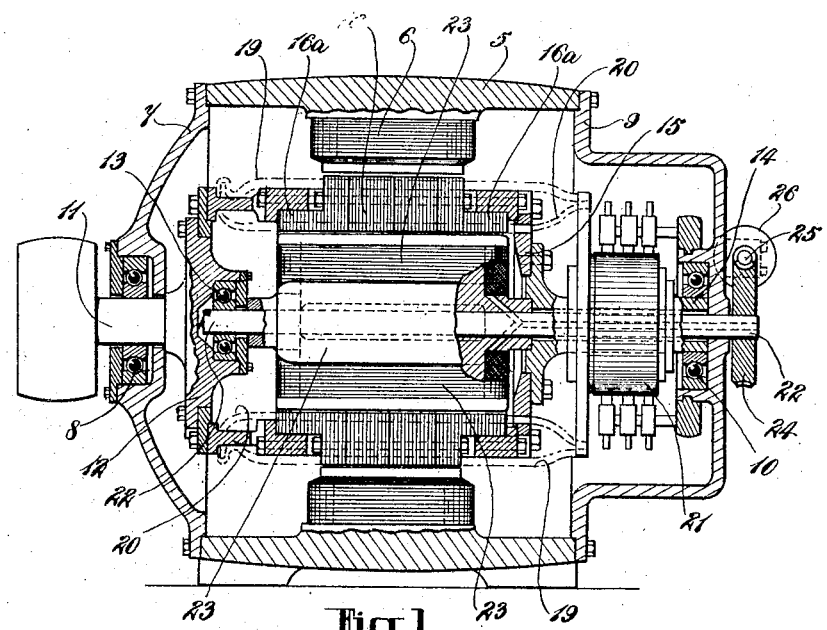
Fig. 1 shows a side elevation partly in longitudinal section of one form of D. C. engine made according to the invention.
Figure 2:
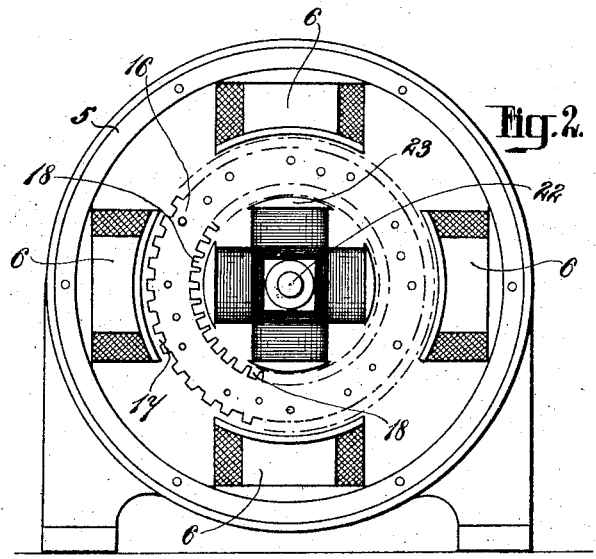
Fig. 2 shows a somewhat diagrammatic end elevation partly is section of Fig. 1, with one side cheek plate and other parts removed.

Referring to Figs. 1 and 2, 5 is the casing of the machine formed or provided with the exterior pole systems having four poles 6 spaced 90 degrees apart. The casing has attached thereto at one end a side cheek 7 which houses a ball bearing 8. At the other end of the casing a side cheek 9 is attached also formed with a housing for another ball bearing, 10.

11 is a shaft running in the bearing 8 and carrying on the interior of the casing a plate 12. This plate is formed with a housing for a ball bearing 13. 14 is a hollow shaft running in the bearing 10 and carrying a plate 15, 16 and 16ª are laminations forming the armature core. These are ring shaped and are carried with suitable connecting members by the side plates. It will be seen that when the laminations are bolted together the core of a cylindrical armature is formed. 17 are slots in the outer surface of the armature core and 18 are slots on its inner surface. 19 shown on the drawing in dot and dash lines, represents diagrammatically the top coils, which are laid on the slots 17 on the outer surface of the armature core. 20 shown in a similar manner on the drawing represents the bottom coils. These are laid in the slots 18 on the inner surface of the armature core. The coils 19 and 20 are suitably connected to the commutator 21.

22 is a shaft, normally fixed, one end of which is carried by a bearing 13 and the other end of which projects from and is supported by the cheek 9. This shaft has fixedly attached thereto the interior pole system, formed with four poles 23 spaced 90 degrees apart. 24 is a worm wheel keyed to the shaft 22 which gears with a worm 25 operated by a hand wheel 26, the spindle of the worm and hand wheel running in a bearing carried by the cheek 9.

As shown, the portion of the shaft 22 which passes through the hollow shaft 14, is itself formed hollow, the hollow portion opening to the exterior by suitable apertures in proximity to the windings of the interior pole system. This construction permits the leads for the interior pole system to be led to the interior for connection.

As shown in Fig. 1, the interior pole system, the cylindrical armature and the exterior pole system are symmetrically arranged. In the form shown the interior field is wider than the exterior field, and co-operates with the laminations 16 and 16ª, whilst the exterior field only directly co-operates with the laminations 16.

In this manner the interior and exterior superficial areas of action are made substantially the same and by suitably winding the interior and exterior pole systems, the effect of the exterior system and the armature is made equal to the effect of the interior system and the armature.

By suitable manipulation of the worm gearing 25 and 24, the interior poles may, as shown in Fig. 2, be brought into axial alignment with the exterior poles or they may be set into any other relationship with the exterior system. This arrangement permits voltage control and further by this means braking can be effected.

Figure 3:
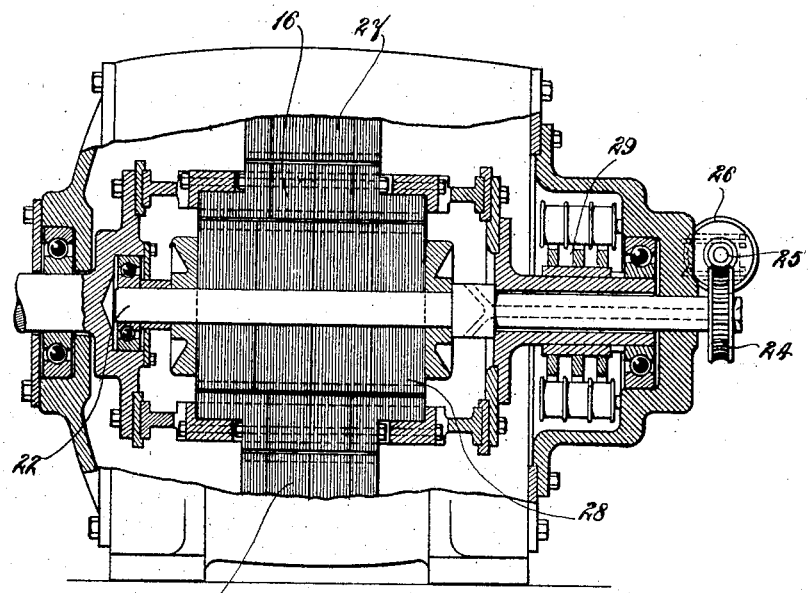
Figs. 3 and 4 are similar views to Figs. 1 and 2 but of an A. C. machine.
Figure 4:
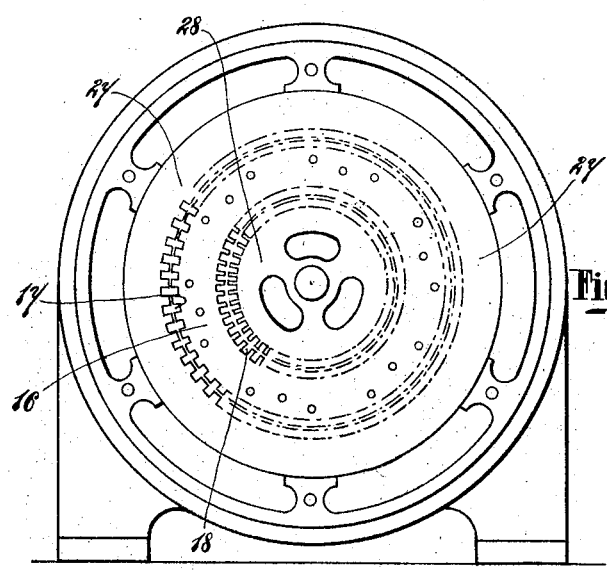

Referring to Figs. 3 and 4, in these figures substantially the same construction and arrangement as that already described is shown, except that the exterior pole system is replaced by a laminated and slotted outer yoke 27 to receive windings not shown in the drawing for the sake of clearness, and the interior pole system is replaced by an inner laminated and slotted core 28 (to take windings), the commutator 21 being replaced by the usual slip rings 29. With this form of A. C. machine the line of primary current could be connected to the windings of the cylindrical rotor or to the outer yoke and inner core, as desired. The relationship between the inner core carried by the normally fixed shaft 22 and the outer yoke can, as will be seen, be set as desired by the adjustment of the worm and worm wheel 25 and 24.

It will of course be understood that the invention is not limited to the constructions and embodiments shown but may be applied in any other suitable manner and also to other electrical appliances which include armatures in their construction.

What I claim as my invention and desire to secure by Letters Patent of the United States of America is:—

1. A dynamo electric machine of the type comprising a rotatable cylindrical armature, a fixed pole system exterior to such armature, a normally fixed but adjustable pole system interior of such armature, end plates attached to and carrying the cylindrical armature, a solid shaft connected to one end plate, a hollow shaft connected to the other end plate, a normally fixed but angularly adjustable shaft on which is mounted the interior pole system, the said normally fixed shaft passing through said hollow shaft, a bearing concentric with the end plate having the solid shaft connected thereto and carried by said solid shaft, for supporting one end of the normally fixed shaft and an exterior casing provided with a bearing for the other end of such normally fixed shaft.

2. A dynamo electric machine of the type comprising a rotatable cylindrical armature, a fixed pole system exterior to such armature, a normally fixed but adjustable pole system interior of such armature, end plates attached to and carrying the cylindrical armature, a solid shaft connected to one end plate, a hollow shaft connected to the other end plate, a normally fixed but angularly adjustable shaft on which is mounted the interior pole system, the said normally fixed shaft passing through said hollow shaft, a bearing concentric with the end plate having the solid shaft connected thereto and carried by said solid shaft, for supporting one end of the normally fixed shaft, an exterior casing provided with a bearing for the other end of such normally fixed shaft, a worm wheel mounted on the end of the fixed shaft which projects from the bearing of the exterior casing, a worm meshing with said worm wheel and operating means for the said worm wheel.

3. A dynamo electric machine of the type comprising a rotatable cylindrical armature, a fixed pole system exterior to such armature, a normally fixed but adjustable pole system interior of such armature, end plates attached to and carrying the cylindrical armature, a solid shaft connected to one end plate, a hollow shaft connected to the other end plate, a normally fixed but angularly adjustable shaft on which is mounted the interior pole system, the said normally fixed shaft passing through said hollow shaft, a bearing concentric with the end plate having the solid shaft connected thereto and carried by said solid shaft for supporting one end of the normally fixed shaft, an exterior casing provided with a bearing for the other end of such normally fixed shaft, a worm wheel mounted on the end of the fixed shaft which projects from the bearing of the exterior casing, a worm meshing with the said worm wheel, operating means for the said worm wheel and a passage in said normally fixed shaft for the leads to the interior pole system.

Signed at Cardiff, in the county of Glamorgan and State of Wales this 19th day of May A. D. 1922.

THOMAS STANLEY JONES.